US007431141B2

(12) United States Patent
Nadeau et al.

(10) Patent No.: US 7,431,141 B2
(45) Date of Patent: Oct. 7, 2008

(54) BASKET POSITIONING SYSTEM FOR MULTI-CHAMBER WASHER

(75) Inventors: Erik Nadeau, Quebec (CA); Louis Martineau, Saint-Nicolas (CA); Michel Emond, Levis (CA); Serge Coulombe, Boischatel (CA)

(73) Assignee: American Sterilizer Company, Mentor, OH (US)

( * ) Notice: Subject to any disclaimer, the term of this patent is extended or adjusted under 35 U.S.C. 154(b) by 0 days.

(21) Appl. No.: 11/765,613

(22) Filed: Jun. 20, 2007

(65) Prior Publication Data

US 2008/0006508 A1 Jan. 10, 2008

Related U.S. Application Data

(60) Provisional application No. 60/816,543, filed on Jun. 26, 2006.

(51) Int. Cl.
*B65G 47/26* (2006.01)

(52) U.S. Cl. ................ 198/459.6; 198/459.7; 193/35 G

(58) Field of Classification Search .............. 198/459.6, 198/459.7; 193/35 A, 35 G, 40
See application file for complete search history.

(56) References Cited

U.S. PATENT DOCUMENTS

| | | | | |
|---|---|---|---|---|
| 3,538,999 | A | 11/1970 | Noren | 198/181 |
| 3,648,742 | A | 3/1972 | Beech | 141/92 |
| 3,724,636 | A | 4/1973 | Wright | 198/19 |
| 3,985,226 | A | 10/1976 | Noren | 198/738 |
| 4,184,579 | A * | 1/1980 | Kantarian et al. | 193/35 A |
| 4,357,176 | A | 11/1982 | Anthony | 134/18 |
| 4,397,536 | A | 8/1983 | Zwettler | 354/322 |
| 4,596,326 | A * | 6/1986 | Yautz, Jr. | 198/463.6 |
| 5,211,276 | A * | 5/1993 | Clopton | 198/345.3 |
| 5,676,235 | A * | 10/1997 | Sam et al. | 198/345.3 |
| 5,890,577 | A * | 4/1999 | Faisant | 193/35 A |
| 5,890,579 | A * | 4/1999 | Young | 198/459.6 |
| 5,911,297 | A * | 6/1999 | Unterhuber | 193/35 A |

(Continued)

*Primary Examiner*—Douglas A Hess
(74) *Attorney, Agent, or Firm*—Kusner & Jaffe; Michael A. Centanni

(57) ABSTRACT

A conveyor system for conveying a basket or rack through a chamber having a system for stopping a rack at a predetermined location along the conveyor. The system is comprised of a rocker device mounted relative to the chamber. The rocker device has a first normal position wherein the rocker device is movable from the first normal position when the rack engages the rocker device. The rocker device has an upper arm and a lower arm. The rocker device is rotatable about an axis disposed between the upper arm and the lower arm. A magnet is disposed on the lower arm of the rocker device. A sensing element is aligned with the magnet when the rocker device is in the first normal position. The sensing element is operable to provide a signal to a system controller. A stop is mounted relative to the chamber. The stop is rotatable from a first position to a second position. The stop has a tab dimensioned to engage the rack in the conveyor system when the stop is in the first position. The tab does not engage the rack when the stop is in the second position. A means of actuating the stop is movably connected to the stop. The means is operable to move the stop between the first position and the second position. The system controller is operable to control the means of actuating based on a signal from the sensing element.

10 Claims, 8 Drawing Sheets

U.S. PATENT DOCUMENTS

| | | | | |
|---|---|---|---|---|
| 6,119,843 | A * | 9/2000 | Robinson | 193/35 A |
| 6,244,279 | B1 | 6/2001 | Bowden | 134/71 |
| 6,290,051 | B1 * | 9/2001 | Herrick, IV | 198/345.3 |
| 6,439,369 | B1 * | 8/2002 | Brown | 198/459.6 |
| 6,763,930 | B2 * | 7/2004 | Johnson et al. | 198/459.6 |
| 7,111,721 | B1 * | 9/2006 | Turner | 198/345.3 |
| 7,249,666 | B1 * | 7/2007 | Robinson | 193/35 A |
| 2006/0032521 | A1 | 2/2006 | Gehrig et al. | 134/71 |

* cited by examiner

BASKET POSITIONING SYSTEM FOR MULTI-CHAMBER WASHER

RELATED APPLICATIONS

This application claims the benefit of U.S. Provisional Application No. 60/816,543, filed Jun. 26, 2006, which is fully incorporated herein by reference.

FIELD OF THE INVENTION

The present invention relates generally to washing systems, and more particularly to a basket positioning system for a multi-chamber washer.

BACKGROUND OF THE INVENTION

A multi-chamber washer is generally comprised of several different chambers that are aligned side-by-side. Each chamber within the washer has a specific purpose, such as washing, rinsing or drying. Objects to be washed within a multi-chamber washer are typically conveyed through the washer in an open basket or rack. The basket or rack moves from one chamber to another along a conveyor system that extends through the washer.

To monitor the position of the racks within the washer, it has been known to place identification tags on the racks and provide a scanning device at the entrance to the washer. It is also known to monitor the position of the racks or baskets within the washer by using magnetic switches. In this respect, a magnet would be installed on the rack. This magnet is detected by a sensor disposed within the washer along the conveyor path. Such sensing systems are typically employed with a stopping mechanism within each chamber that stops the racks or baskets at a certain position within each chamber. Accurate positioning of a rack within a chamber is required for a number of reasons. For example, some racks include specialized spray devices that require connection to water sources at predetermined locations within the washer. Thus, a rack must be aligned with such sources, to ensure proper connection thereto.

To facilitate accurate positioning of the racks within the washer, mechanical stops have been provided at predetermined positions within the washer to stop a rack moving along a conveyor at such predetermined positions. Typically, such stops are comprised of a barrier attached to a cylinder. The cylinder is typically oriented perpendicular to the path of the racks to move the barrier into and from a position obstructing the path. In other words, the cylinders are at right angles to the direction of movement of the racks, with the barrier located at the end of the cylinder rod. As such, when the cylinder is in a fully extended position with the barrier intersecting the path of a rack, a force perpendicular to the axis of the cylinder rod is exerted on the cylinder rod when the rack engages the barrier. Such a force tends to cause premature wear of the cylinder as a result of the end of the cylinder rod being pushed out of axial alignment with the cylinder.

Another problem with indexing systems known heretofore is that the magnetic switch systems as described above require a magnet on each rack that is used within the washer. Moreover, the rack or basket must be properly aligned and oriented within the washer to ensure that the magnet on the rack moves past the sensor. In addition to the foregoing, damage to the basket outside of the washer can result in improper or faulty readings when a damaged rack or magnet is used within the washer. Still further, positioning of sensors within the washer unit places the sensor in a damp, wet environment wherein the sensors are more likely to fail.

The present invention overcomes these and other problems and provides an improved indexing system for positioning racks or baskets within a multi-chamber washer.

SUMMARY OF THE INVENTION

In accordance with a preferred embodiment of the present invention, there is provided a conveyor system for conveying a basket or rack through a chamber having a system for stopping a rack at a predetermined location along the conveyor. The system is comprised of a rocker device mounted relative to the chamber. The rocker device has a first normal position wherein the rocker device is movable from the first normal position when the rack engages the rocker device. The rocker device has an upper arm and a lower arm. The rocker device is rotatable about an axis disposed between the upper arm and the lower arm. A magnet is disposed on the lower arm of the rocker device. A sensing element is aligned with the magnet when the rocker device is in the first normal position. The sensing element is operable to provide a signal to a system controller. A stop mounted relative to the chamber. The stop is rotatable from a first position to a second position. The stop has a tab dimensioned to engage the rack in the conveyor system when the stop is in the first position. The tab does not engage the rack when the stop is in the second position. A means of actuating the stop is movably connected to the stop. The means is operable to move the stop between the first position and the second position. The system controller is operable to control the means of actuating based on a signal from the sensing element.

One advantage of the present invention is a multi-chamber washer having an improved rack indexing system therein.

Another advantage of the present invention is a multi-chamber washer as described above having a position sensing mechanism, wherein the sensor is located outside of the washer.

Another advantage of the present invention is a multi-chamber washer as described above having a stop assembly including a moving cylinder wherein force exerted by the moving baskets on the stop is exerted axially on the cylinder.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
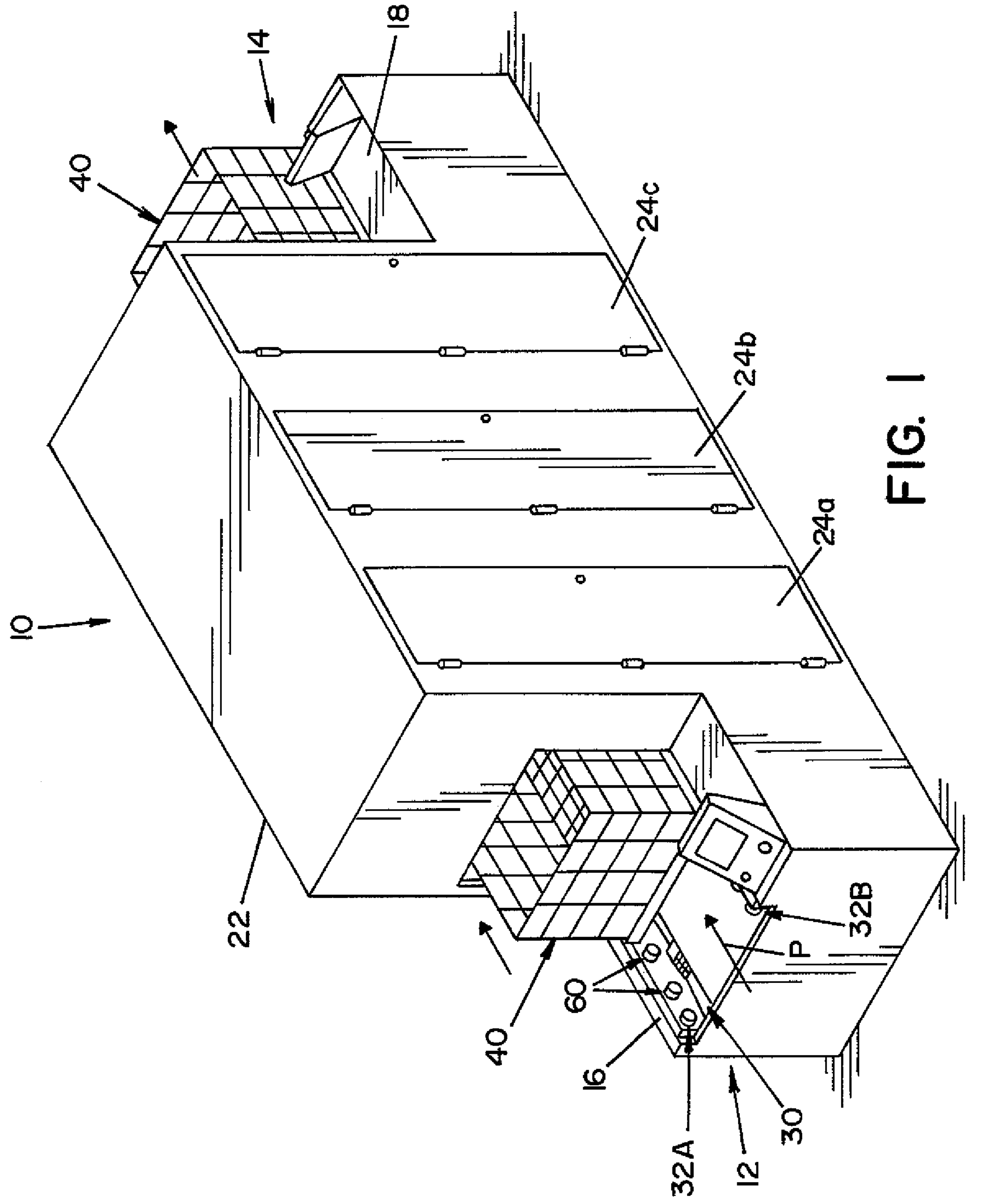
FIG. 1 is a perspective view of a multi-chamber washer.

Referring now to the drawings wherein the showings are for the purpose of illustrating a preferred embodiment of the invention only, and not for the purpose of limiting same, FIG. 1 shows a multi-compartment washer 10.

Washer 10 has a loading end 12 and an unloading end 14. A loading platform 16 is provided at loading end 12 of washer 10, and an unloading platform 18 is provided at unloading end 14 of washer 10. Washer 10 includes an outer housing 22 that is generally rectangular in shape. In the embodiment shown, housing 22 has three access panels 24*a*, 24*b*, 24*c* to allow access to components of washer 10 within housing 22.

A conveyor system 30 defines a path "P" through washer 10. Conveyor system 30 is comprised of spaced-apart, first and second rows 32A, 32B of spaced-apart conveyor roller assemblies 60. Conveyor roller assemblies 60 in each row 32A, 32B are linearly aligned. Conveyor system 30 is designed to convey a basket 40 through washer 10. Basket 40 is generally square or rectangular in shape, having an opened upper end for receiving articles to be washed. In the embodiment shown, basket 40 is comprised of a plurality of connected wire rods 42 that are attached to a bottom frame 44, having a rectangular cross-section, best seen in FIGS. 3 and 4.

Figure 2:
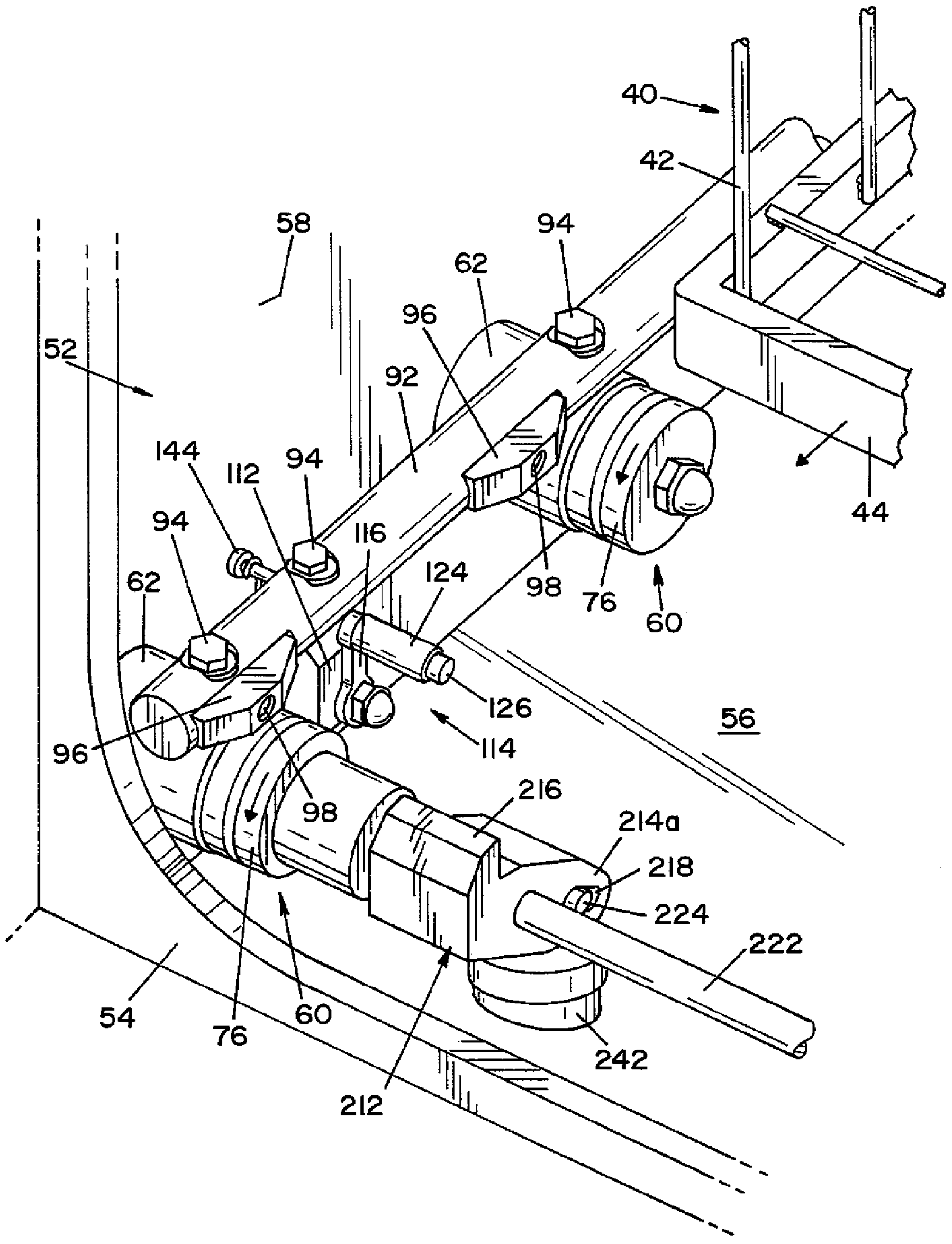
FIG. 2 is a perspective view of a portion of a chamber from the multi-chamber washer shown in FIG. 1.

Referring now to FIG. 2, a portion of one washer compartment, designated 52, is shown. Washer compartment 52 is basically defined by a bulkhead 54, a floor panel 56, and side panels 58.

Each roller assembly 60 is dimensioned for mounting to a side panel 58 of housing 22. Each roller assembly 60 includes a mounting block 62 that is dimensioned to be attached to the inner side panel of housing 22 by fasteners (not shown). In the embodiment shown, mounting block 62 is generally cylindrical in shape. A cylindrical bore (not shown) extends through mounting block 62. A shaft (not shown) is disposed within the cylindrical bore within mounting block 62 to be rotatable therein. The shaft is dimensioned to extend beyond the ends of mounting block 62. One end of the shaft extends out from housing 22. A sprocket gear 72 is mounted to this end of the shaft. A drive chain or belt 74 engages sprocket 72 to rotate the shaft within mounting block 62. The other end of the shaft includes a roller 76 for supporting racks or baskets 40 conveyed through multi-chamber washer 10.

Figure 8:
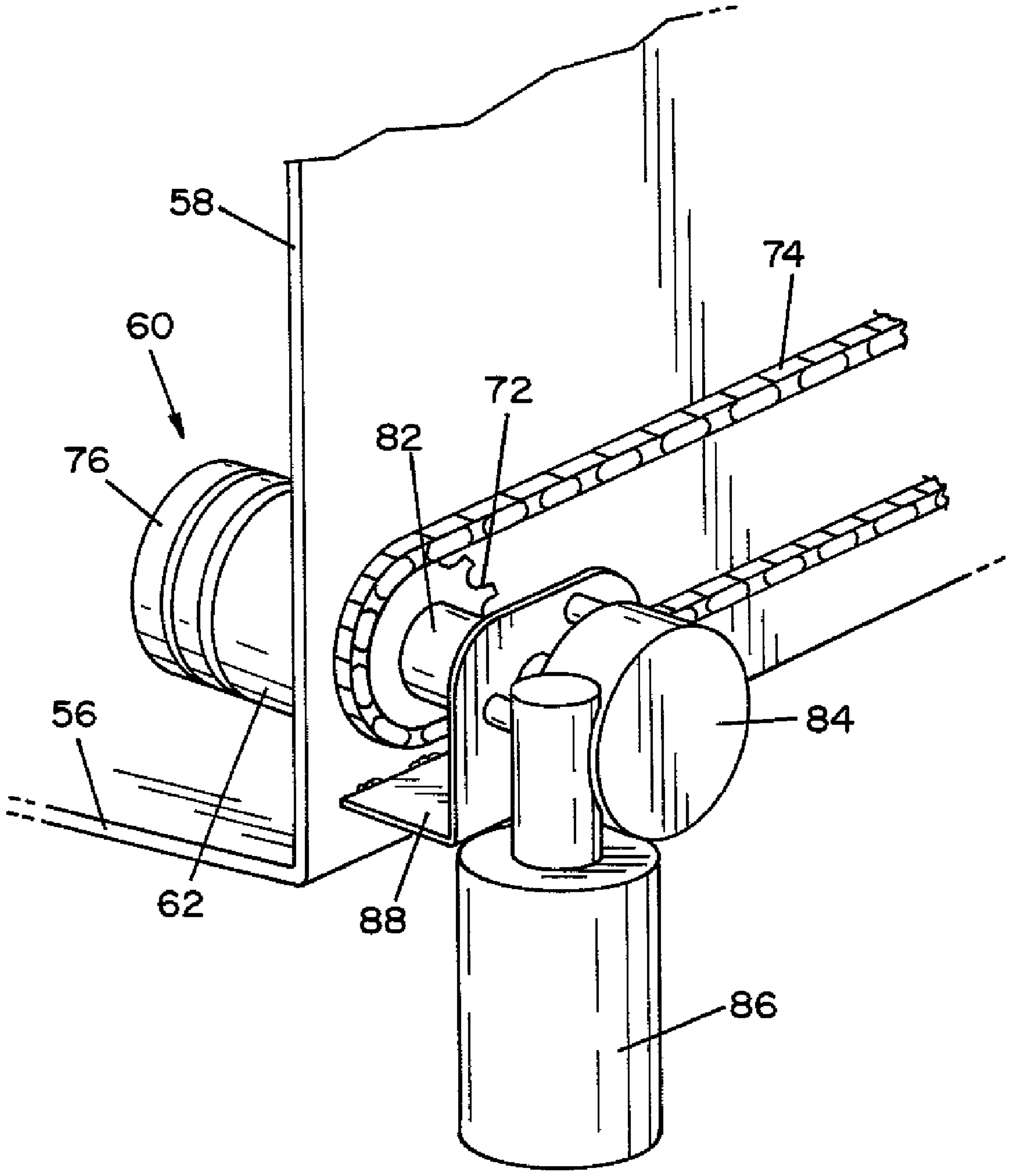
FIG. 8 is perspective view of a drive system for driving a conveyor system that conveys rack through the multi-chamber washer.

FIG. 8 shows a roller assembly 60 disposed at one end of multi-chamber washer 10. A drive shaft 82 connected at one end to a sprocket 72 and at another end to a gear reducer 84, that in turn, is connected to a drive motor 86. Drive motor 86 is operable to rotate drive shaft 82 and sprocket 72 thereon, and thereby, move the drive chain 74. Gear reducer 84 and drive motor 86 are supported by a bracket 88 attached to side panel 58. A side rail 92 is attached to the upper edges of mounting blocks 62 of roller assemblies 60, as best seen in FIG. 2. Conventional fastener 94 extending through rail 92 into mounting block 62 of roller assemblies 60 secure rail 92 to mounting block 62. Guides 96 are attached to the side of rail 92 by fasteners 98.

Conveyor assembly 30, as heretofore described, is part of a rack indexing, i.e., positioning, system that also includes a rack sensing assembly 100 and a rack stop assembly 200. In an alternative embodiment of the present invention, one or more rack stop assemblies 200, not shown, are disposed at discrete locations in multi-chamber washer 10. As each rack stop assembly 200 disposed in multi-chamber washer 10 is similar, only one rack stop assembly shall be described below.

Figure 3:
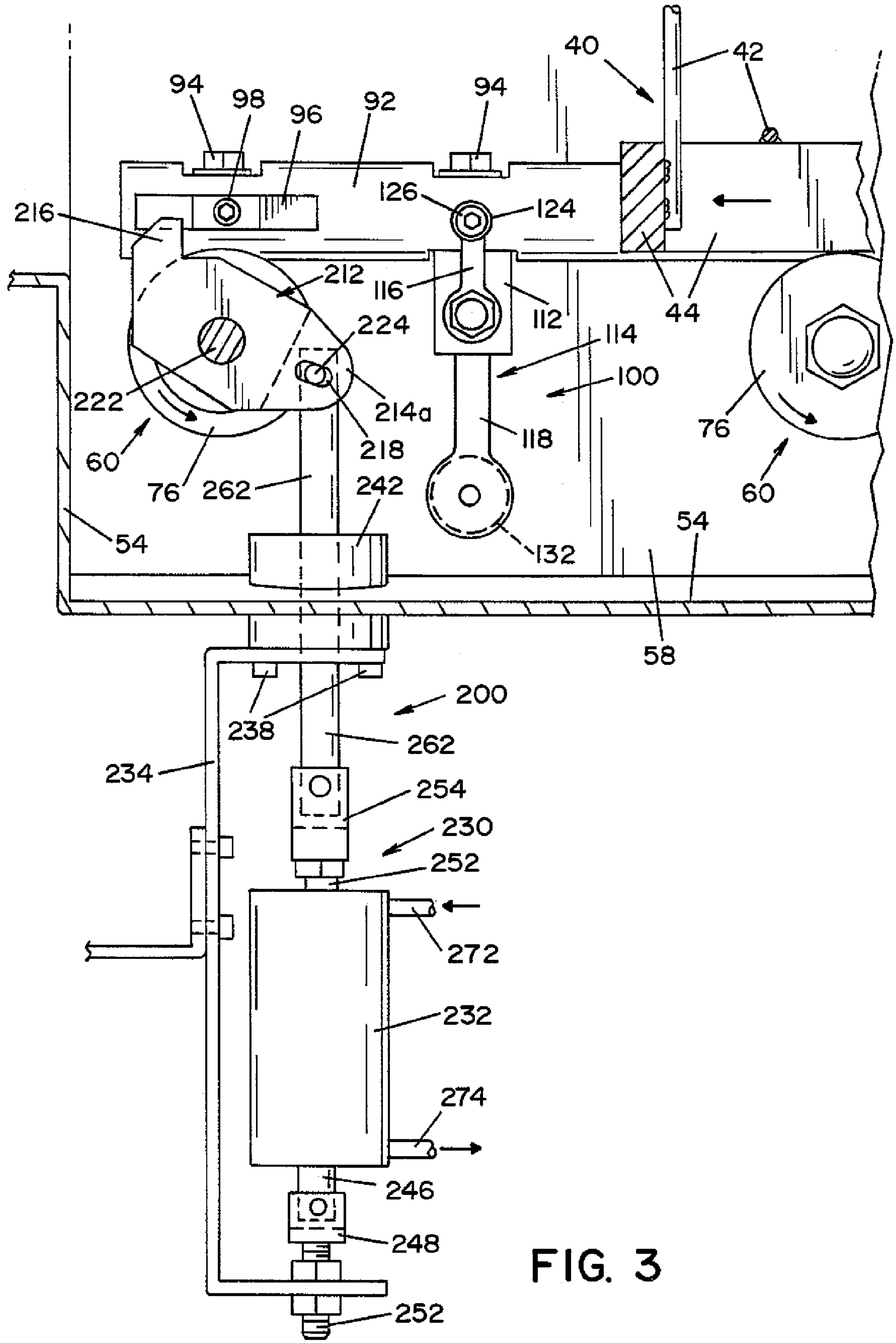
FIG. 3 is a partially-sectioned, elevational view of an indexing system for indexing racks or baskets within the multi-chamber washer, showing a rack moving along a conveyor path within a chamber of the washer.
Figure 5:
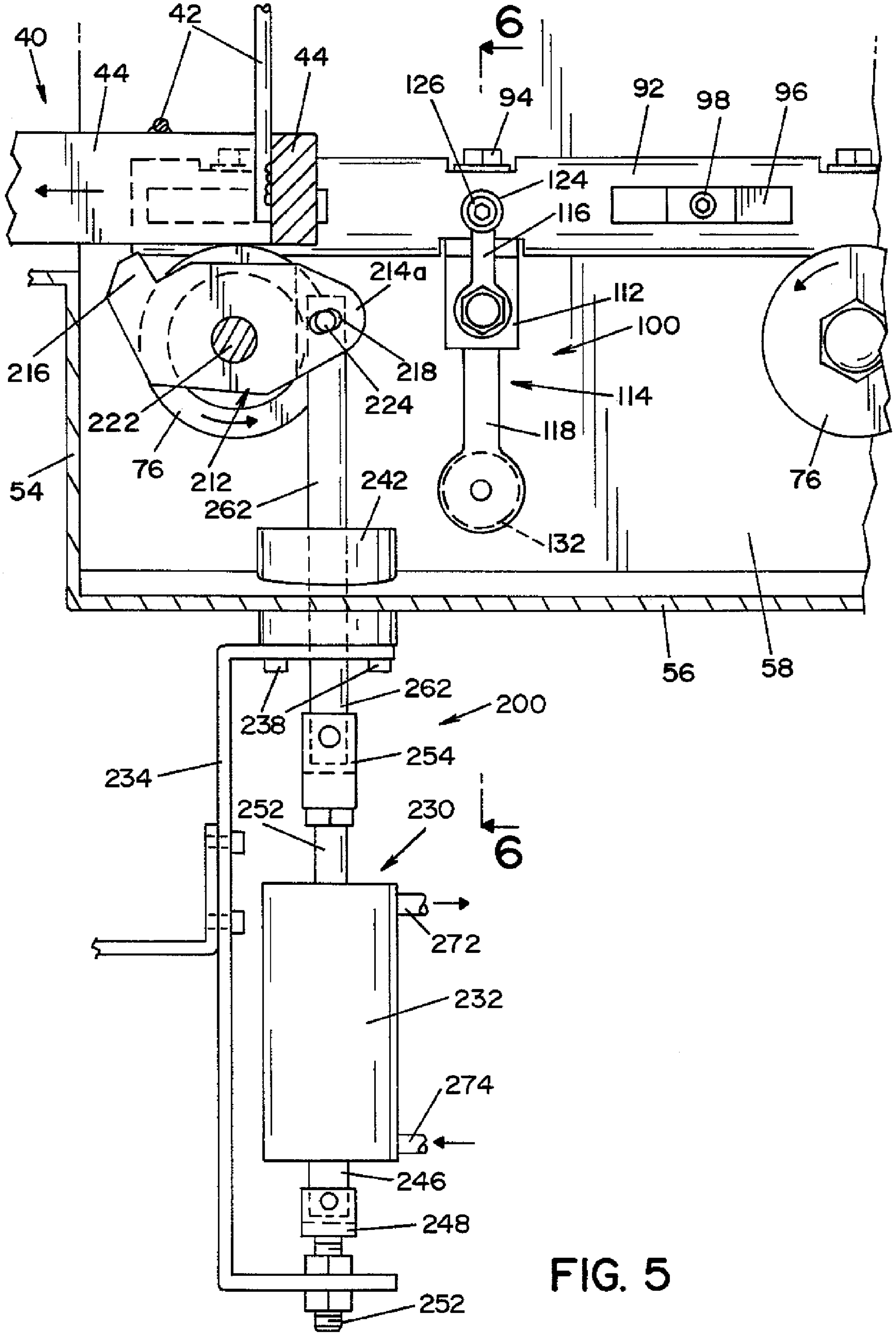
FIG. 5 is a partially-sectioned, elevational view of the indexing system shown in FIGS. 3 and 4 showing a rack being conveyed past the mechanical stop.
Figure 6:
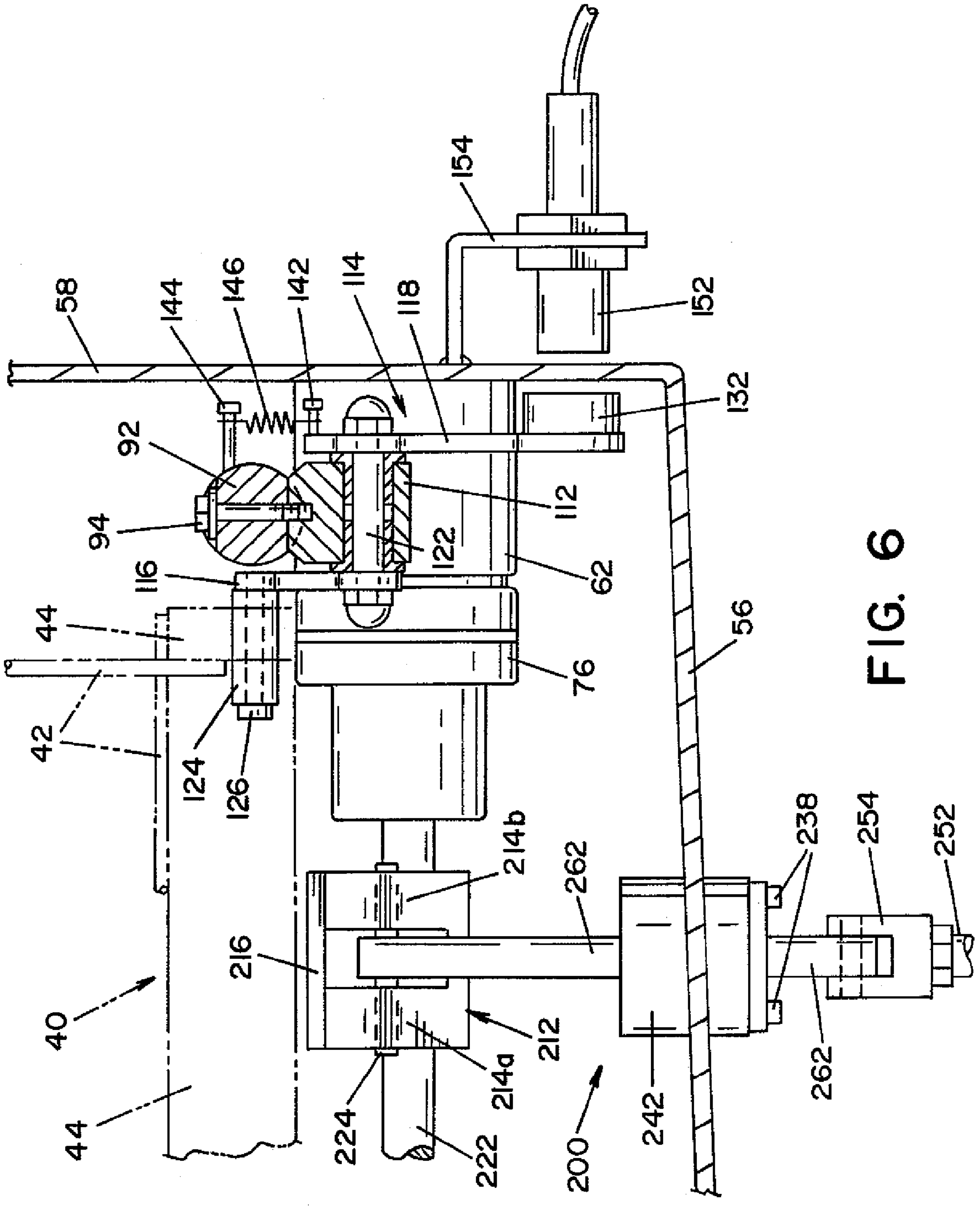
FIG. 6 is a sectional view taken along lines 6-6 of FIG. 5.
Figure 7:
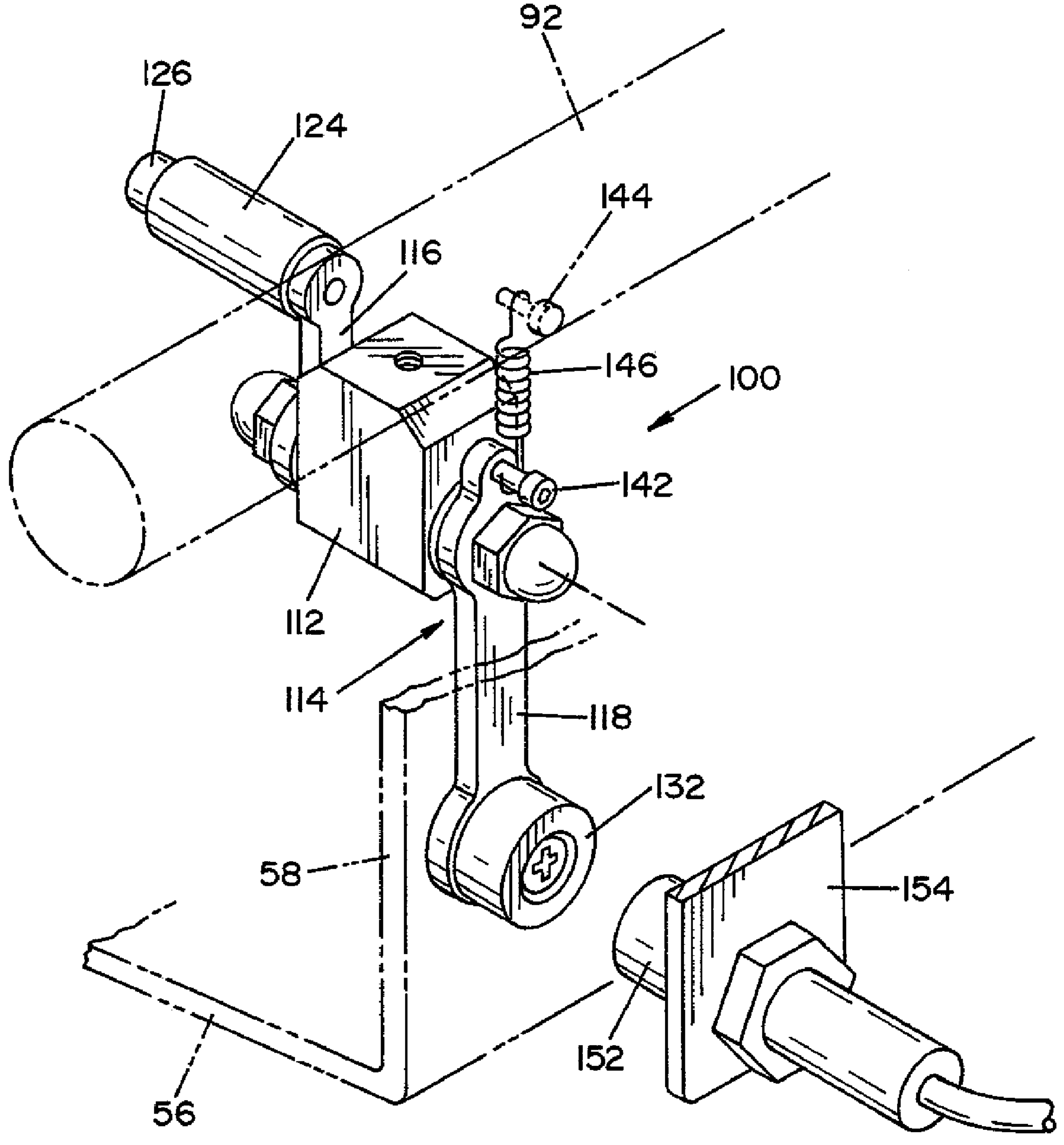
FIG. 7 is a perspective view of a position sensing device for sensing the position of a rack within the multi-chamber washer.

Rack sensing assembly 100, best seen in FIG. 7, is comprised of a support block 112 that is mounted to the underside of one of side rail 92. A rocker device 114 is mounted to support block 112. Rocker device 114 is comprised of two (2) arm sections, i.e., an upper arm section 116 and a lower arm section 118, that are connected to each other by a pin 122 that extends through support block 112. Arm sections 116, 118 extend in opposite directions from pin 122, as best seen in FIG. 6. Upper arm section 116 is disposed to the inside, toward the center of the chamber, and extends upwardly above the upper edges of aligned rollers 76. A cylindrical roller 124, mounted to a shaft 126, extends from the free end of upper arm section 116. Roller 124 is oriented horizontally, and is disposed to be within path "P" so as to intersect a rack 40 moving along conveyor 30, as shall be described in greater detail below. Lower arm section 118 is disposed between rail 92 and side panel 58, and extends in a generally downward direction. A magnet 132 is attached to the free end of lower arm section 118. Lower arm section 118 is disposed such that magnet 132 on the free end thereof is adjacent to the inner surface of side panel 58. The weight of magnet 132 causes rocker device 114 to assume a first position, as illustrated in FIGS. 3 and 5. A fastener 142 is attached to the upper end of lower arm section 118. Fastener 142 is disposed adjacent a fastener 144 mounted to rail 92. A biasing element 146, in the form of a tension spring, is connected at one end to fastener 142 on lower arm section 118, and at the other end to fastener 144 on rail 92. Biasing element 146 is operable to bias rocker device 114 to a first, normal position, as illustrated FIGS. 3 and 5.

A sensing element 152 is mounted onto a support bracket 154 that is attached to the exterior side of side panel 58. Sensor 152 is positioned adjacent the exterior surface of side panel 58 to be aligned with magnet 132 on lower arm section 118 of rocker device 114 when magnet 132 is in the first position. Sensing element 152 is preferably a REED switch that is capable of detecting variations in a magnetic field.

Figure 4:
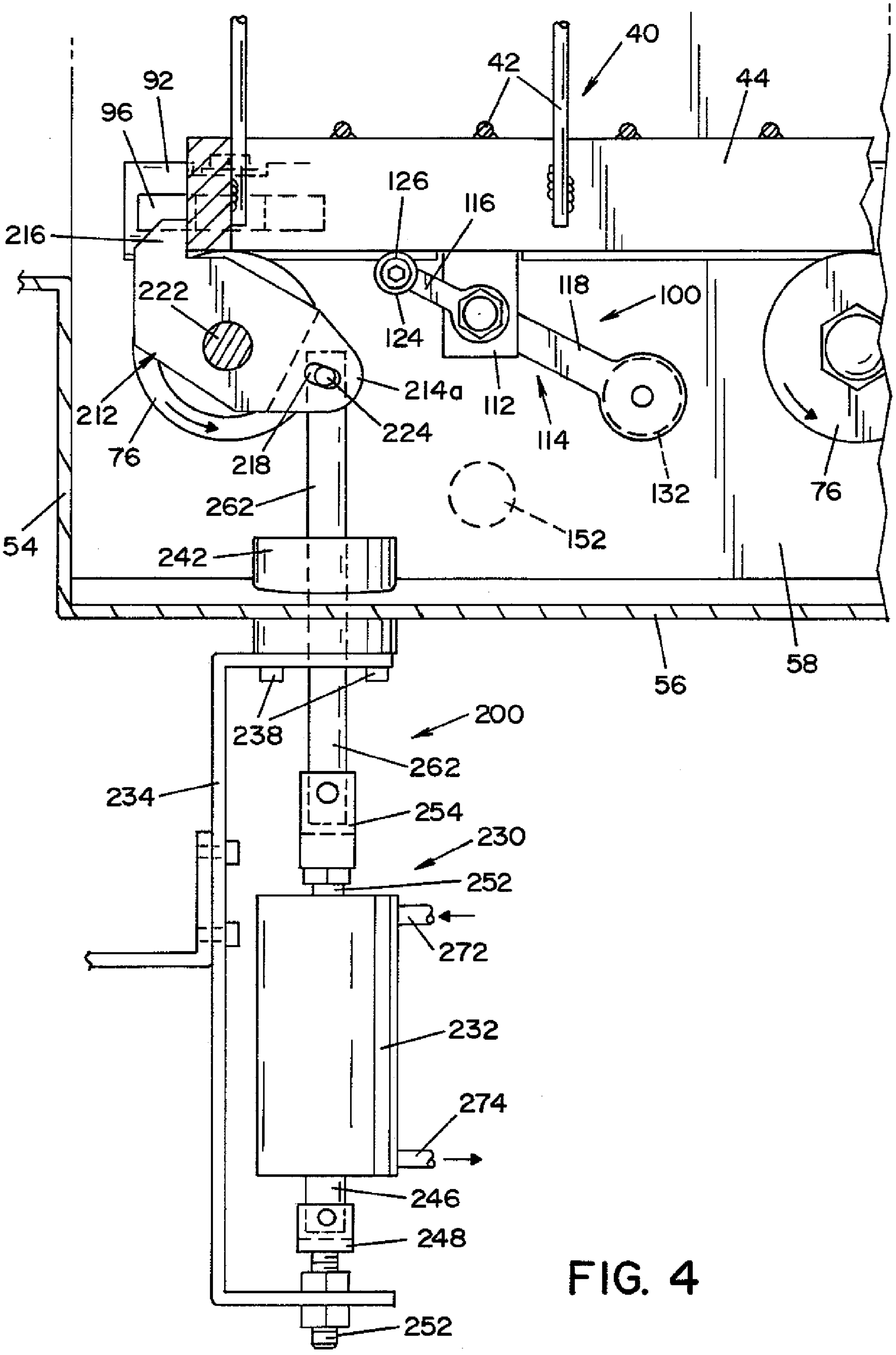
FIG. 4 is a partially-sectioned, elevational view of the indexing system shown in FIG. 3, showing the rack stopped at a desired position within the chamber by a mechanical stop.

Referring now to FIGS. 3-5, stop assembly 200 is best seen. Stop assembly 200 is basically comprised of a movable stop 212 and an actuator assembly 230 for moving stop 212 between a first position wherein stop 212 obstructs movement of racks 40 along the conveyor path "P," and a second position wherein stop 212 does not obstruct movement of racks 40 along conveyor path "P." In the embodiment shown, actuator assembly 230 is comprised of a pneumatic cylinder 232, A mounting bracket 234 is provided to support cylinder 232 beneath bottom panel 56 of a chamber in washer 10. Mounting bracket 234 is generally C-shaped, as best seen in FIG. 3. An upper end of bracket 234 is attached by fasteners 238 to a guide block 242 that extends through bottom panel 56 of housing 22.

A mounting shaft 246 extends from the bottom end of pneumatic cylinder 232. Shaft 246 is pinned to a clevis 248 that is attached to a threaded rod 252. Rod 252 is secured to the lower end of mounting bracket 234.

The other end of cylinder 232 includes a movable piston rod 252. A clevis element 254 is attached to the free end of piston rod 252 of cylinder 232. An elongated connector rod 262 is pinned at one end to clevis element 254 on cylinder piston rod 252. Connecting rod 262 extends through guide block 242. The upper end of connector rod 262 is connected to stop 212. Stop 212 is basically a block having spaced-apart leg portions 214*a*, 214*b* at one end, and a wall portion 216 at the other. Stop 212 is pivotally mounted onto a shaft 222 that extends perpendicular to a conveyor path "P." In the embodiment shown, shaft 222 is co-axially aligned with the axes of roller assembly 60 that is located at the end of the chamber. A slot 218 is formed in each leg portion 214*a*, 214*b* of stop 212 to receive a pin 224 that extends through the end of connector rod 262. Pin 224 connects connector rod 262 to stop 212. Pneumatic cylinder 232 is connected to an air source by two (2) supply lines 272, 274.

Referring now to the operation of washer 10, articles to be washed within washer 10 are placed within racks or baskets 40. A loaded rack 40 is placed upon conveyor system 30 that is exposed at loading platform 16 at loading end 12 of washer 10.

An operator initiates a washing cycle. A controller, not shown, energizes drive motor 86 to drive the conveyor drive chain or belt 74 to cause each roller assembly 60 within washer 10 to rotate in a direction to draw rack or basket 40 into washer 10. Sensing assembly 100 and a stop (barrier) assembly 200 are disposed at the end of each chamber to facilitate positioning of rack 40 within each chamber.

FIG. 3 illustrates rollers 76 being rotated to draw rack 40 toward the end of the chamber. As illustrated in FIG. 3, pneumatic cylinder 232 is retracted to cause the stop block 212 to move wall portion 216 to a position that obstructs movement of rack 40 along conveyor path "P." FIG. 3 shows stop assembly 200 with stop 212 in the rack-obstructing position. As illustrated in FIG. 3, drive rollers 76 are energized to convey rack 40 toward stop 212 and sensing system 100 disposed between stop 212 and rack 40.

As illustrated in FIG. 4, as rack 40 is conveyed to stop 212, rack 40 first engages the elongated roller 124 on rocker device 114. The weight of rack 40 causes rocker device 114 to pivot along the axis of connector pin 122, thereby moving magnet 132 on lower arm section 118 of rocker device 114 away from its original, normal position to a position shown in FIG. 4. Movement of magnet 132 away from sensor 152 on the opposite side of side panel 58 creates a signal that is conveyed to the controller. (Side panel 58 is typically formed of stainless steel that is not magnetic, and thus allows sensor 152 to detect movement of magnet 132.) The signal provides an indication of the position of the leading edge of rack 40 as it moves toward stop 212. In this respect, the controller is operable to allow conveyor system 30 to operate for a predetermined amount of time following the signal from sensing system 100. The period of time is sufficient to ensure that rack 40 engages stop 212. Thereafter, conveyor system 30 may be deactivated, with rack 40 being positioned as shown in FIG. 4. An operation is then performed on the articles within rack 40. As indicated above, this operation may include rinsing, washing or drying of the articles within rack 40.

Following the predetermined operation, the controller causes cylinder 232 to extend thereby rotating stop 212 counter-clockwise, as indicated in FIG. 5, and moving wall portion 216 of stop 212 away from the path of rack 40. At the same time, conveyor rollers 76 are energized to convey rack 40 to the next chamber or to the unloading platform of washer 10.

As will be appreciated, rack 40 may be conveyed to a subsequent chamber where a similar sensing system and stop system are provided to position, i.e., index, the rack in the next chamber for the next subsequent operation. In an alternative embodiment (not shown), a first stop system and a second stop assembly are positioned in each chamber of washer 10. First stop system is disposed to engage a front edge of rack 40 and second stop system is disposed to engage a back edge of rack 40. In this respect, first stop system and second stop system are operable to "capture" rack 40 at a discrete location in a chamber of washer 10.

As will also he appreciated, washer 10 may contain a multiple number of racks 40, one rack 40 within each chamber. Sensing system 100 thus provides an indication of the presence of rack 40 within a chamber, in addition to controlling the operation of conveyor system 30.

According to another aspect of the present invention, during the operation of conveyor roller system 30, a sensing relay (not shown) monitors the current use by drive motor 86. By sensing the current of motor 86, it is possible to automatically control the power source to motor 86 if a blockage within conveyor system 30 is sensed by an increase in current due to an unexpected load on the motor. In other words, whatever torque required by the conveyor system increases, current drawn by motor 86 increases as well. By monitoring the motor current, it is possible to detect undesirable events or blockage along the conveyor path.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. In a conveyor system for conveying a basket or rack through a chamber, a system for stopping a rack at a predetermined location along said conveyor, said system comprised of:

a rocker device mounted relative to said chamber, said rocker device having a first normal position wherein said rocker device is movable from said first normal position when said rack engages said rocker device, said rocker device have an upper arm and a lower arm, said rocker device rotatable about an axis disposed between said upper arm and said lower arm;

a magnet disposed on said lower arm of said rocker device;

a sensing element aligned with said magnet when said rocker device is in said first normal position, said sensing element operable to provide a signal to a system controller;

a stop mounted relative to said chamber, said stop rotatable from a first position to a second position, said stop having a tab dimensioned to engage said rack in said conveyor system when said stop is in said first position, said tab not engaging said rack when said stop is in said second position;

a means of actuating said stop, said means movably connected to said stop, said means operable to move said stop between said first position and said second position; and said system controller operable to control said means of actuating based on a signal from said sensing element.

2. A system as defined in claim 1, further comprising:

a biasing element attached to said rocker device, said biasing element biasing said rocker device to said first normal position.

3. A system as defined in claim 2, wherein said biasing element is a spring.

4. A system as defined in claim 1, further comprising:

a roller disposed on said upper arm of said rocker device, said roller dimensioned to engage said rack when said rocker device is in said first normal position.

5. A system as defined in claim 1, wherein said sensing element is a REED switch capable of detecting variations in a magnetic field.

6. A system as defined in claim 1, wherein said means of actuation is a pneumatic cylinder.

7. A system as defined in claim 1, wherein said means of actuation is movable along an axis perpendicular to said path.

8. A system as defined in claim 1, further comprising:

a belt attached to said chamber, said belt operable to engage said rack and convey said rack through said chamber;

a motor attached to said chamber, said motor engaging said belt; and a sensor attached to said motor, said sensor operable to sense a current in said motor and provide a signal relative to said current in said motor to said controller.

9. A system as defined in claim 1, further comprising:

a second stop mounted relative to said chamber, said second stop rotatable from a first position to a second position, said second stop having a tab dimensioned to engage said rack in said conveyor system when said second stop is in said first position, said tab not engaging said rack when said second stop is in said second position; and a means of actuating said second stop, said means movably connected to said second stop, said means operable to move said second stop between said first position and said second position.

10. A system as defined in claim 9, wherein said stop is disposed at one end of said chamber and said second stop is disposed at the another end of said chamber, said stop and said second stop dimensioned to selectively engage said rack when said rack is in said chamber.

* * * * *